US006394437B1

(12) United States Patent
Yonezawa

(10) Patent No.: US 6,394,437 B1
(45) Date of Patent: May 28, 2002

(54) CLAMPING APPARATUS

(75) Inventor: Keitaro Yonezawa, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 09/924,537

(22) Filed: Aug. 9, 2001

(30) Foreign Application Priority Data

Sep. 12, 2000 (JP) ....................................... 2000-275932

(51) Int. Cl.[7] ................................................. B23Q 3/08

(52) U.S. Cl. .......................... 269/32; 269/309; 269/38; 74/54; 74/409

(58) Field of Search .......................... 269/309, 32, 134, 269/38, 136, 20, 25, 27, 310, 48.1, 234; 198/345; 228/49.3; 74/54, 409, 25, 125.5

(56) References Cited

U.S. PATENT DOCUMENTS

| | | | | | |
|---|---|---|---|---|---|
| 4,488,713 | A | | 12/1984 | Kosmal et al. | |
| 4,537,389 | A | | 8/1985 | Kancnik et al. | |
| 6,024,354 | A | | 2/2000 | Yonezawa | |
| 6,095,509 | A | * | 8/2000 | Yonezawa | 269/309 |
| 6,101,888 | A | | 8/2000 | Yonezawa | |
| 6,102,383 | A | * | 8/2000 | Tunkers | 269/32 |
| 6,115,898 | A | * | 9/2000 | Sawdon | 269/32 |
| 6,189,877 | B1 | * | 2/2001 | Boris | 269/32 |
| 6,199,847 | B1 | * | 3/2001 | Fukui | 269/32 |
| 6,231,035 | B1 | * | 5/2001 | De Graaf | 269/32 |

FOREIGN PATENT DOCUMENTS

| | | |
|---|---|---|
| GB | 939912 | 10/1963 |

* cited by examiner

*Primary Examiner*—Joseph J. Hail, III
*Assistant Examiner*—Daniel Shanley
(74) *Attorney, Agent, or Firm*—Bacon & Thomas, PLLC

(57) ABSTRACT

When clamping, compressed air within a second chamber (22) of a pneumatic cylinder (12) is discharged and fresh compressed air is supplied to a first chamber (21). Then a pressure of the compressed air within the first chamber (21) and an urging force of a compression spring (25) move a piston (20) leftwards. The piston (20) moves an output rod (26) rightwards strongly through a plurality of engaging balls (34) and a first pressure receiving member (31). When unclamping, the compressed air within the first chamber (21) is discharged and fresh compressed air is supplied to the second chamber (22). Then a pressure of the compressed air within the second chamber (22) moves the piston (20) rightwards and at the same time the output rod (26) leftwards.

13 Claims, 9 Drawing Sheets

CLAMPING APPARATUS

BACKGROUND OF THE INVENTION

1. Field of the Invention

The present invention relates to a clamping apparatus of such a type that pulls an output rod.

2. Explanation of Related Art

U.S. Pat. No. 4,488,713 disclosed a conventional example of the clamping apparatus of this type.

The conventional technique forms a pneumatic chamber below a piston. When clamping, it pulls an output rod through the piston with compressed air supplied to the pneumatic chamber. And when unclamping, it returns the output rod through the piston by a compression spring.

The conventional technique had a problem that it produces only a small clamping force because the compressed air which is utilized as working fluid has a low pressure.

SUMMARY OF THE INVENTION

The present invention has an object to provide a clamping apparatus which can produce a strong clamping force.

In order to accomplish the above-mentioned object, the present invention has constructed a clamping apparatus in the following manner, for example, as shown in FIGS. 1 to 9, FIG. 10 or FIG. 11.

An annular piston 20 is axially movably and hermetically inserted into a cylinder portion 13. A first chamber 21 is formed between a first end wall 15 of the cylinder portion 13 and the piston 20. A second chamber 22 is formed between a second end wall 16 of the cylinder portion 13 and the piston 20. An output rod 26 is provided substantially concentrically with the piston 20. The output rod 26 is axially movably and hermetically inserted into the second end wall 16. Within the second chamber 22, a first pressure receiving member 31 and a second pressure receiving member 32 axially oppose to each other in an annular space defined between the piston 20 and the output rod 26. An annular engaging space 33 is formed between the first pressure receiving member 31 and the second pressure receiving member 32 so that it narrows radially inwards. A plurality of engaging members 34 are inserted into the engaging space 33 and spaced apart from each other peripherally at a predetermined interval. The first pressure receiving member 31 and the second pressure receiving member 32 are connected to a first end 26*a* of the output rod 26 and to the second end wall 16, respectively. A driving means 47 provided in the first chamber 21 drives the piston 20 toward the second end wall 16, thereby enabling a push surface 37 provided on the piston 20 to drive means the output rod 26 toward the first end wall 15 through the engaging members 34 and the first pressure receiving member 31 in the mentioned order. On the other hand, when pressurized fluid is supplied to the second chamber 22, the pressurized fluid drives the piston 20 to return it toward the first end wall 15 and the output rod 26 to return it toward the second end wall 16.

As for the driving: means 47, it is considered to utilize at least one of a pressurizing force of pressurized fluid which is supplied to the first chamber 21 and an urging force of a spring 25 attached to the first chamber 21.

Further, as for a clamp member which is connected to a second end 26*b* of the output rod 26, it is considered to use a clamp arm 10 in FIG. 2 and a T-leg 7 in FIG. 11.

The present invention functions in the following manner, for example, as shown in FIGS. 2 and 3.

Under an unclamping condition shown in FIG. 2, compressed air or the like pressurized fluid is supplied to the second chamber 22. A pressure of the pressurized fluid moves the piston 20 toward the right which is the first end and the output rod 26 toward the left which is the second end. This moves the plurality of engaging members 34 radially outwards of the engaging space 33 and brings the first pressure receiving member 31 near the second pressure receiving member 32.

When switching over the unclamping condition of FIG. 2 to a clamping condition of FIG. 3, the pressurized fluid is discharged from the second chamber 22 and the driving means 47 moves the piston 20 toward the left which is the second end. Then the push surface 37 provided on the piston 20 moves the engaging members 34 radially inwards of the engaging space 33. This allows the first pressure receiving member 31 and the second pressure receiving member 32 to try to strongly separate from each other in a right and left direction by a wedging action of the engaging members 34. And the second end wall 16 of the cylinder portion 13 receives the second pressure receiving member 32, thereby enabling the first pressure receiving member 31 to pull the output rod 26 rightwards strongly.

In consequence, the present invention offers the following effect.

A driving force added from the driving means to the piston can be force-multiplicably converted and then transmitted to the output rod through the engaging members and the first pressure receiving member. Therefore, it is possible to strongly pull the output rod. This results in the possibility of strongly clamping a metal mold or the like objects to be fixed by the clamp member such as the clamp arm or the T-leg connected to the output rod.

Besides, when unclamping, the pressurized fluid which has been supplied to the second chamber can return not only the piston but also the output rod. Accordingly, it is possible to omit a return means intended exclusively for returning the output rod. This leads to the possibility of making the clamping apparatus compact with a simple structure.

The present invention includes the following clamping apparatus.

For example, as shown in FIG. 6 or FIG. 9, the engaging members 34 comprise balls, rollers or the like rolling members. In this case, it is possible to drive the engaging members smoothly by a small frictional force with the result of enhancing a transmission efficiency and eventually producing a larger clamping force.

The present invention further includes the following clamping apparatus.

For instance, as shown in FIGS. 2 and 3 or in FIG. 10, the cylinder portion:13 is fixed to a support block 6. The support block 6 swingably supports a fulcrum portion 10*a* of a clamp arm 10. A second end 26*b* of the output rod 26 is swingably connected to an input portion 10*c* of the clamp arm 10. In this case, it is possible to swing the clamp arm by an axial driving force of the output rod and therefore to provide a proper clamping apparatus depending on the kind of the metal mold or the like objects to be fixed.

The present invention furthermore includes the following clamping apparatus.

For example, as shown in FIGS. 2 and 3 or in FIG. 10, the cylinder portion 13 is detachably attached to the support block 6. In this case, the support block and the cylinder portion are made as separates parts. Thus the cylinder portion can be utilized for clamping apparatuses of different, types as a common part. This results in the possibility of manufacturing those clamping apparatuses at a low cost and besides facilitating maintenance.

The present invention still includes the following clamping apparatus.

For example, as shown in FIGS. 2 and 3 as well as in FIGS. 4A and 4B, the support block 6 has its lower portion provided with a T-leg 7 which engages with a T-groove 8 of a fixing pedestal 1 or a T-groove of a guide block attached to the fixing pedestal 1. The T-leg 7 is provided with a projection 7*a* which vertically faces an output portion 10*b* of the clamp arm 10. In this case, it is possible to vertically hold the metal mold or the like objects to be fixed: between the output portion of the clamp arm and the projection of the T-leg when clamping. This can prevent the support block from inclining by a clamp reaction force which occurs at that clamping time. In consequence, it is possible to decrease a swing angle of the clamp arm by an angle corresponding to the inclination of the support block. As a result, it is possible to reduce a stroke of the output rod and ultimately to make the clamping apparatus compact. In the event that at least one part of the driving means is composed of the pressurized fluid which is supplied to the first chamber, the pressurized fluid is consumed in a smaller amount owing to the fact that the stroke of the output rod is reduced. This can provide an energy saving clamping apparatus.

The present invention still includes the following clamping apparatus.

For example, as shown in FIG. 10, the support block 6 is detachably attached to a side surface (or an upper surface) of the fixing pedestal 1. In this case, the T-groove or the like need not be provided in the fixing pedestal. This makes the structure for attaching the clamping apparatus simple and reliable.

The present invention still more includes the following clamping apparatus.

For example, as shown in FIG. 5A, the push surface 37 of the piston 20 comprises an arcuate surface 38 and a tapered surface 39 formed in the mentioned order from the second end wall 16 toward the first end wall 15.

BRIEF DESCRIPTION OF THE DRAWINGS

FIGS. 1 to 9 show a first embodiment of the present invention;

FIG. 1 is a systemic view of a metal mold fixing system which employs a clamping apparatus;

FIG. 2 is a vertical sectional view of the clamping apparatus under an unclamping condition;

FIG. 3 is a vertical sectional view of the clamping apparatus under a clamping condition;

FIG. 5A shows the force multiplier released;

FIG. 5B illustrates the force multiplier starts locking;

FIG. 5C shows the force multiplier has finished locking;

FIG. 6 is a schematic view in section when seen from a left side of the force multiplier. A right half view shows it released and a left half view illustrates it has finished locking;

FIG. 7 is a graph showing a relationship between a stroke of an output rod of the clamping apparatus and its ability;

FIG. 8 shows a first modification of the force multiplier and is a view similar to FIG. 5A;

FIG. 9 shows a second modification of the force multiplier and is a view similar to FIG. 6;

DESCRIPTION OF THE PREFERRED EMBODIMENTS

FIGS. 1 to 9 show a first embodiment of the present invention. The first embodiment exemplifies a case where a pneumatic force multiplier clamping apparatus is applied to a system for fixing a metal mold of a press machine.

Figure 1:
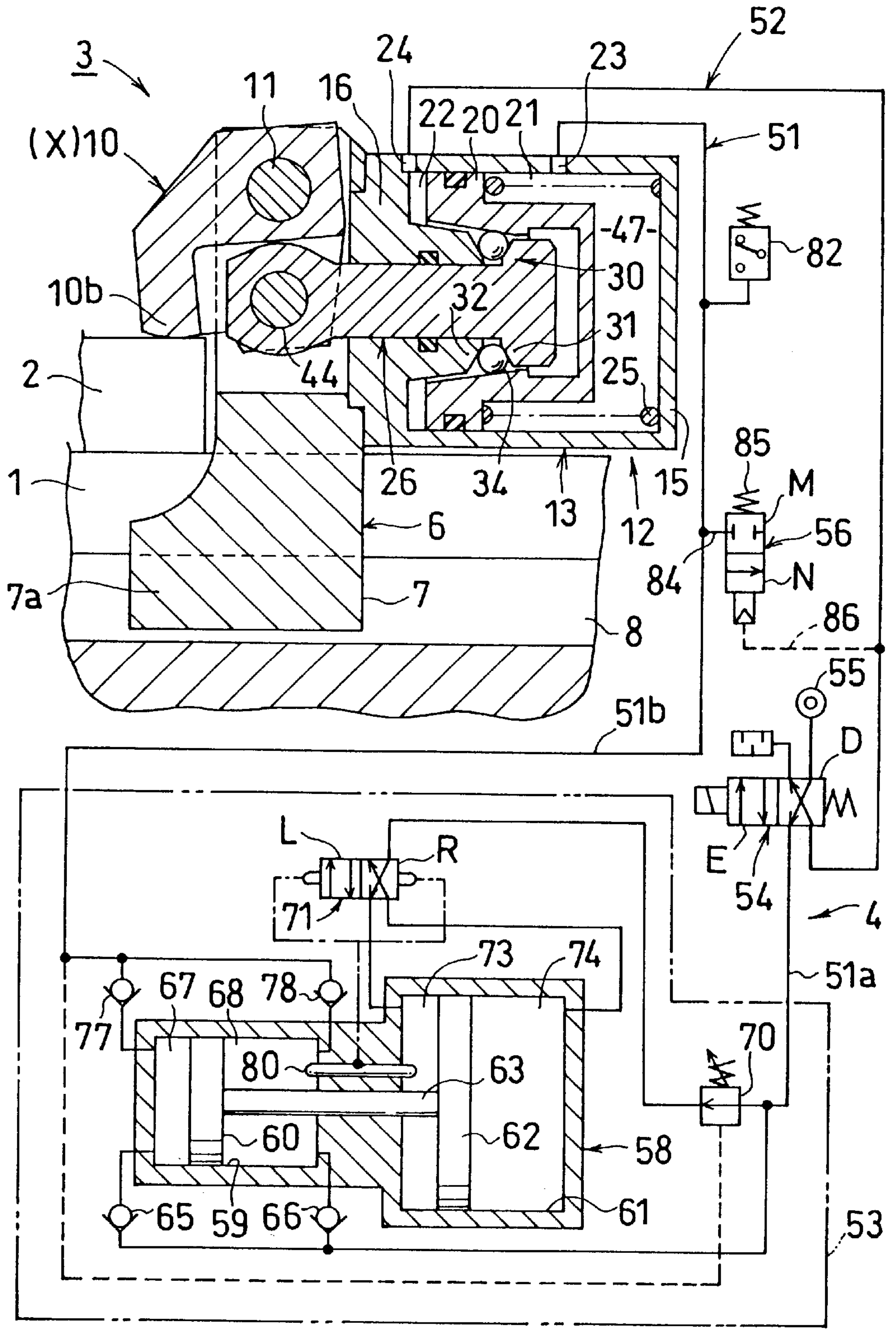

As shown in a systemic view of FIG. 1, the system comprises a plurality of clamping apparatuses 3 for fixing a metal mold 2 placed on an upper surface of a bolster 1 of a press machine, and a supply and discharge device 4 which supplies compressed air to those clamping apparatuses 3 and discharges it therefrom. Here only one of the apparatuses 3 is shown.

Figure 2:
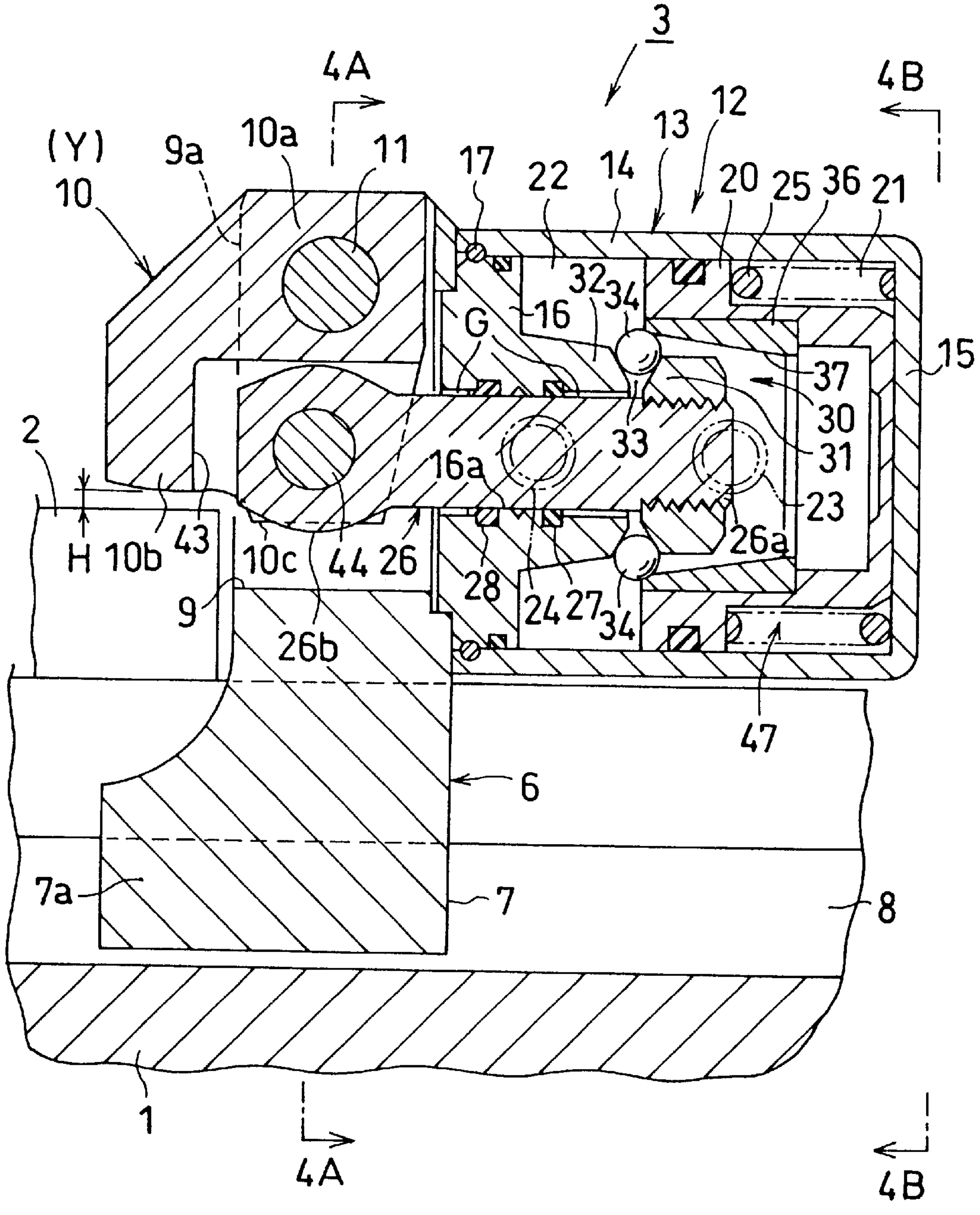
Figure 3:
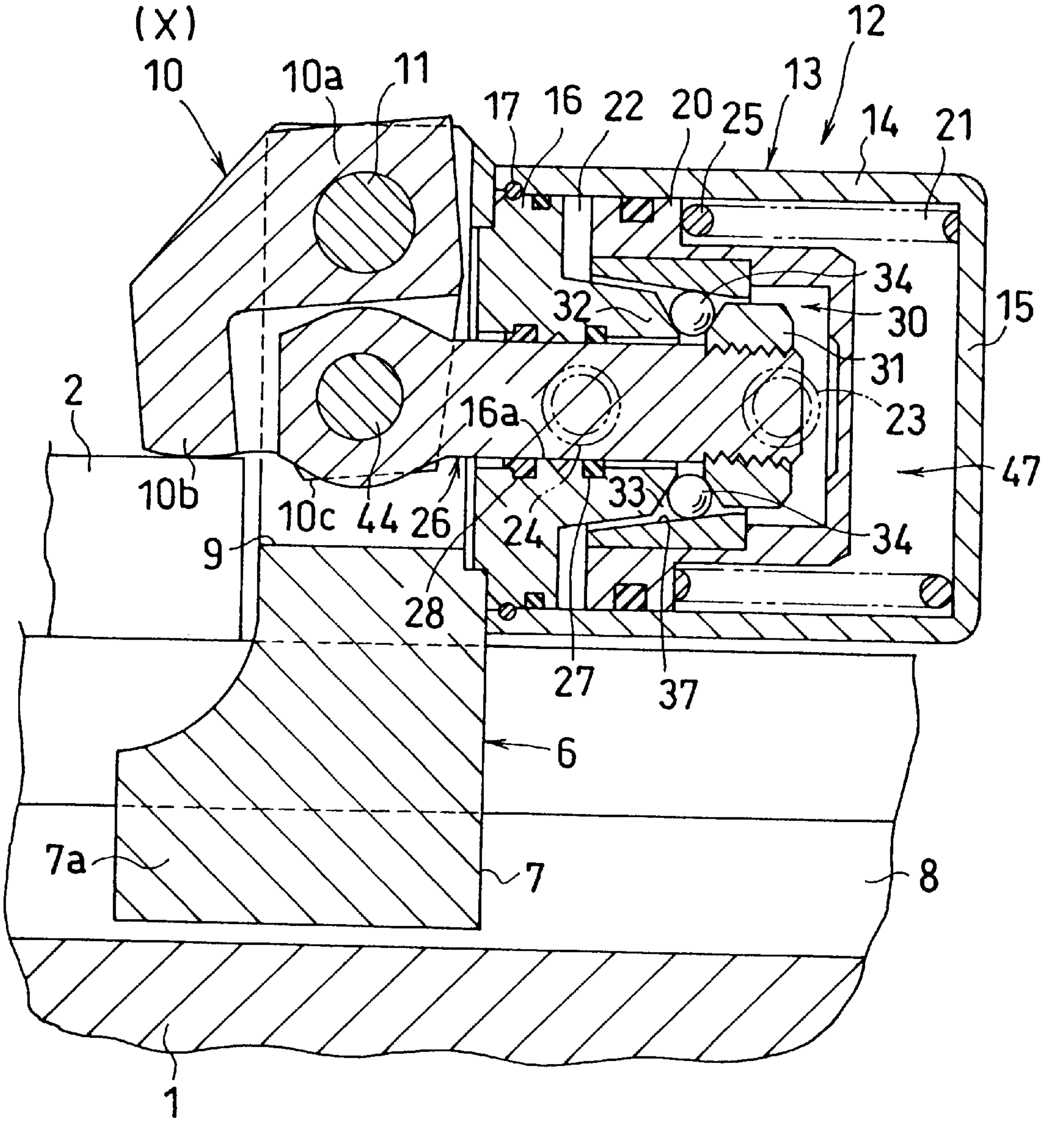
Figure 4B:
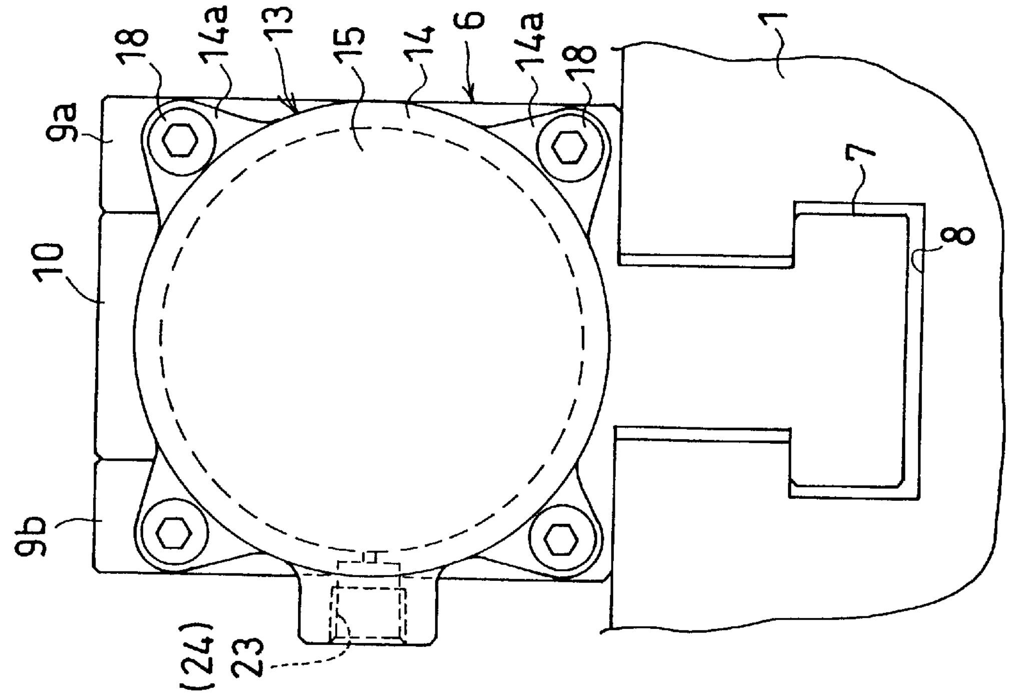
FIG. 4B is a right side view and corresponds to a view when seen along a line 4B—4B in a direction indicated by arrows in FIG. 2.
Figure 4A:
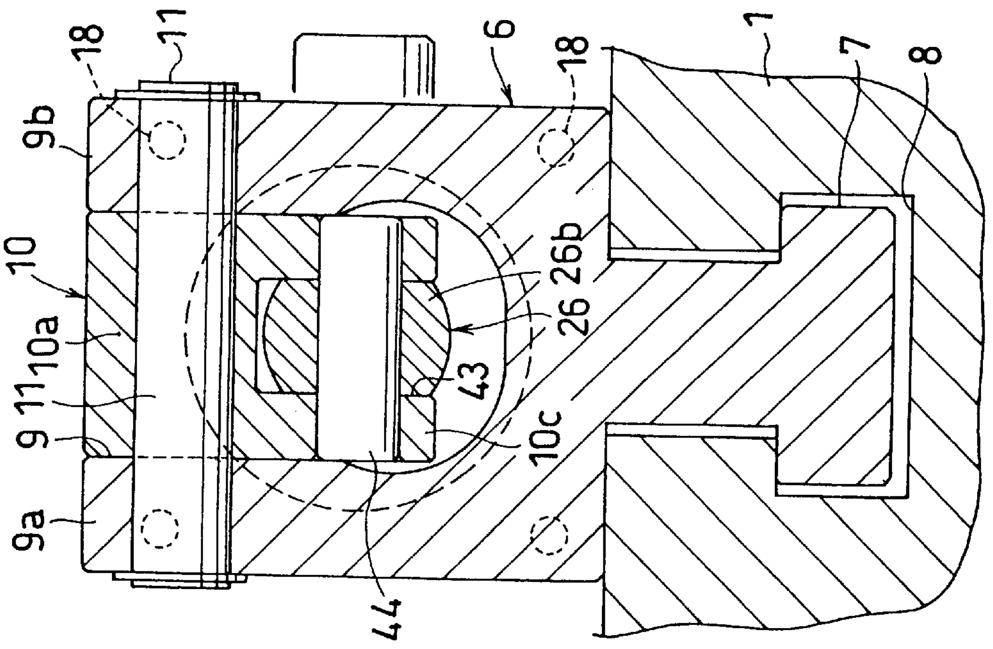
FIG. 4A is a sectional view when seen from a left side and corresponds to a view when seen along a line 4A—4A in a direction indicated by arrows in FIG. 2.

First, explanation is given for a structure of the clamping apparatus 3 based on FIGS. 2 and 3 as well as on FIGS. 4A and 4B. FIG. 2 is a vertical sectional view showing the clamping apparatus 3 under an unclamping condition. FIG. 3 is a vertical sectional view of the clamping apparatus 3 under a clamping condition. FIG. 4A is a sectional view when seen from a left side and corresponds to a view when seen along a line 4A—4A in a direction indicated by arrows in FIG. 2. FIG. 4B is a right side view corresponding to a view when seen along a line 4B—4B in a direction indicated by arrows in FIG. 2.

The clamping apparatus 3 includes a support block 6. The support block 6 has a lower portion provided with a T-leg 7 which engages with a T-groove 8 of the bolster 1. The support block 6 has an upper portion formed with a upper groove 9. A clamp arm 10 is inserted into the upper groove 9. The clamp arm 10 has a fulcrum portion 10*a* supported swingably by side walls 9*a*, 9*b* of the upper groove 9 through a pivot pin 11.

Further, the T-leg 7 projects leftwards in FIG. 2. The projection 7*a* vertically faces an output portion 10*b* of the clamp arm 10.

An upper half portion of the support block 6 has a right surface to which a cylinder portion 13 of a double-acting type pneumatic cylinder 12 is fixed.

More specifically, the cylinder portion 13 comprises a cylinder barrel 14, a right end wall 15 of a first end wall and an end, plate 16 of a second end wall. The end plate 16 is hermetically inserted into a left end portion of the cylinder barrel 14 and is prevented from removing by a retaining ring 17. And as shown in FIG. 4B, four brackets 14*a* project from the left end portion of the cylinder barrel 14 and are detachably attached to the support block 6 by four bolts 18.

An annular piston 20 is axially movably and hermetically inserted into the cylinder barrel 14. A first chamber 21 for clamping is formed between the piston 20 and the right end wall 15. A second chamber 22 for unclamping is formed between the piston 20 and the end plate 16.

The cylinder barrel 14 has a lateral portion provided with a first supply and discharge port 23 which communicates with the first chamber 21 and also provided with a second supply and discharge port 24 which communicates with the second chamber 22.

A clamp holding compression spring 25 is attached within the first chamber 21.

An output rod 26 is arranged radially inwards of the piston 20 and concentrically therewith. The output rod 26 is axially movably and hermetically inserted into a through hole 16*a* of the end plate 16 through a sealing member 27 and a scraper 28. Radial gaps (G) each having a predetermined size are provided outside the sealing member 27 and the scraper 28 in a left and right direction between an outer peripheral surface of the output rod 26 and the through hole 16*a*. The radial gaps (G) enable the output rod 26 to slightly swing in a vertical direction.

A force multiplier 30 is provided between a right half portion of the output rod 26 and the piston 20. The force multiplier 30 is explained by relying on FIG. 5A to FIG. 5C and FIG. 6 with reference to FIGS. 2 and 3.

Figure 5A:
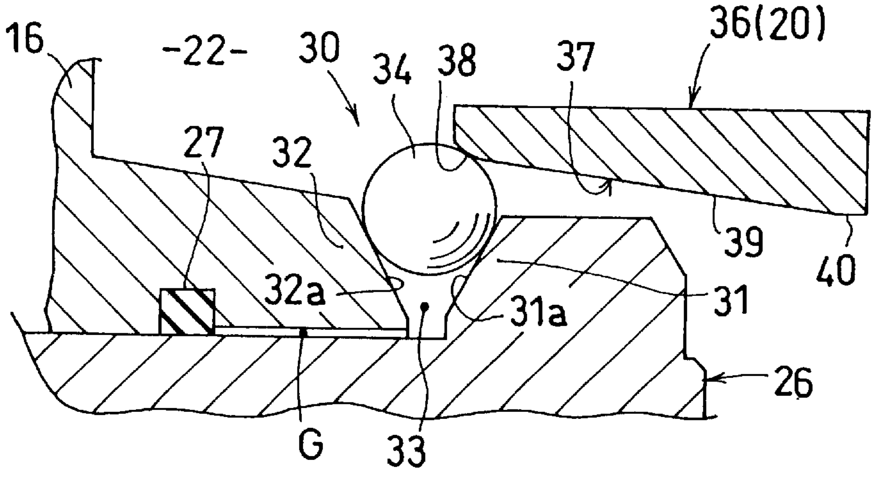
FIG. 5A to FIG. 5C explain how a force multiplier of the clamping apparatus operates.
Figure 5B:
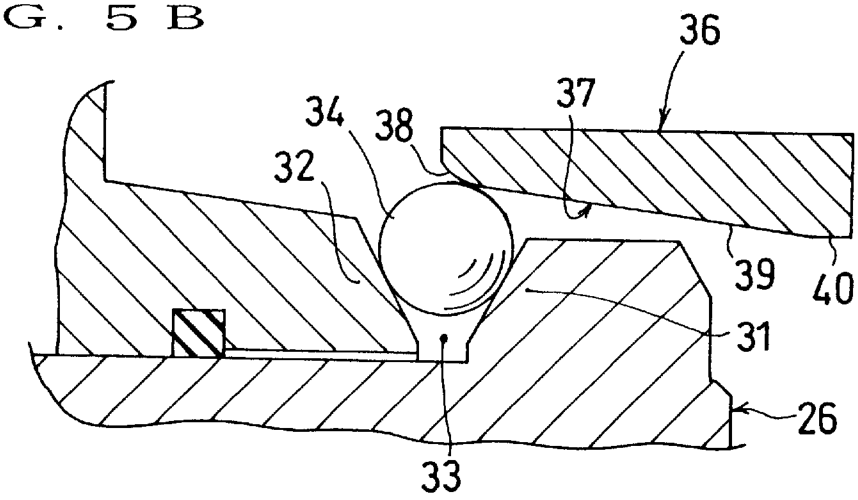
Figure 5C:
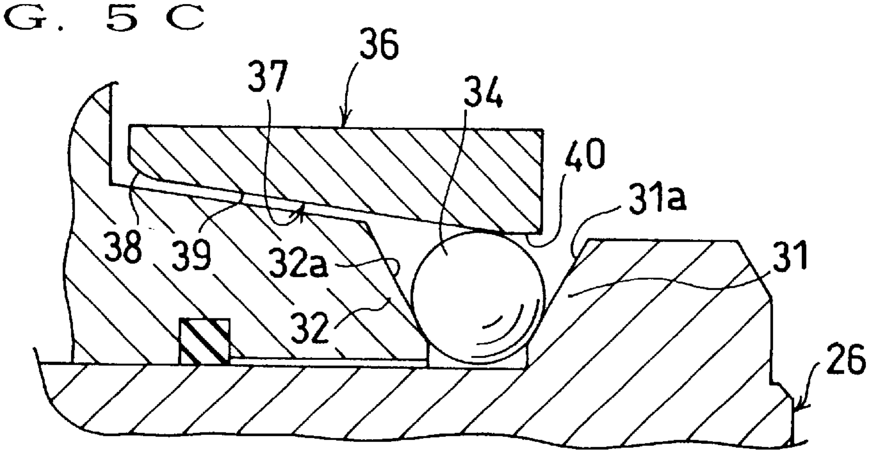
Figure 6:
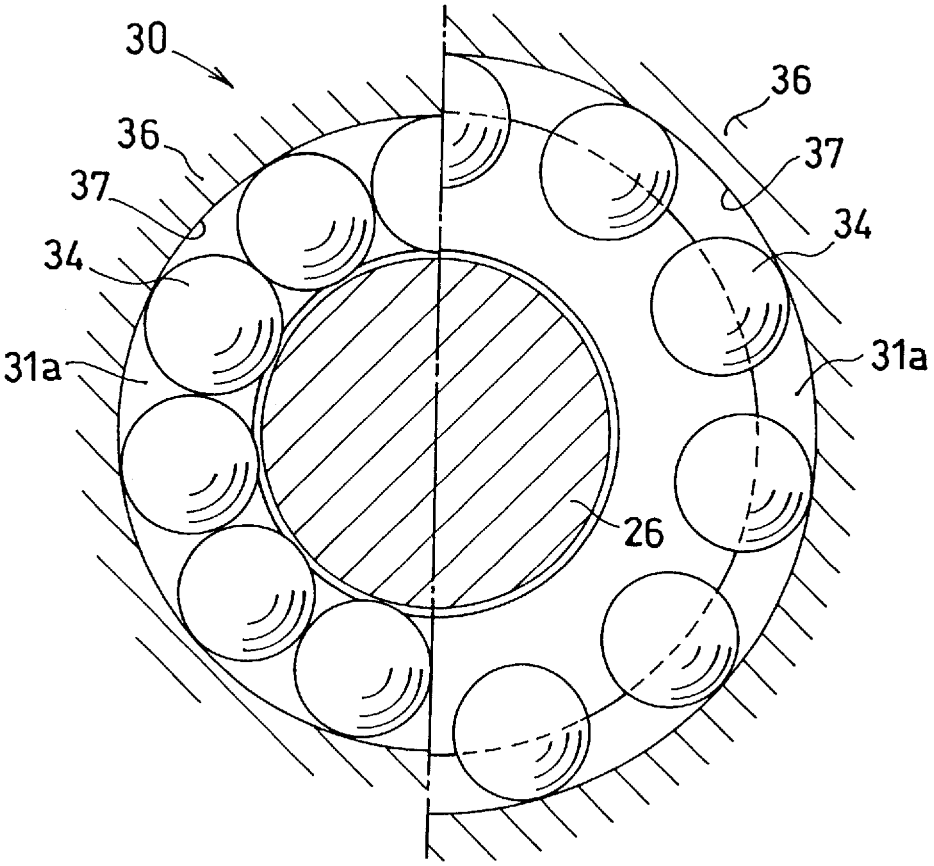

FIG. 5A to FIG. 5C explain how the force multiplier 30 operates. FIG. 5A shows it released. FIG. 5B shows it starts locking. FIG. 5C shows it has finished locking. FIG. 6 is a schematic view in section when the force multiplier 30 is seen from its left side. A right half view shows it released and a left half view illustrates it has finished locking.

A first pressure receiving member 31 and a second pressure receiving member 32 axially oppose to each other in an annular space defined between the piston 20 and the output rod 26 within the second chamber 22. An annular engaging space 33 is formed between the first and the second pressure receiving members 31, 32 so that it narrows radially inwards. A plurality of engaging balls (engaging members) 34 are inserted into the engaging space 33 and spaced apart from each other peripherally at a predetermined interval.

Preferably, a first cam surface 31*a* of the first pressure receiving member 31 and a second cam surface 32*a* of the second pressure receiving member 32 are formed with shallow U-shaped grooves extending radially and spaced apart from each other peripherally at a predetermined interval, respectively, and the engaging balls 34 are inserted into the respective U-shaped grooves, although not shown.

The piston 20 has an inner periphery to which a push ring 36 is attached in fitting relationship. The push ring 36 has a push surface 37 brought into contact with the plurality of engaging balls 34. As shown in FIG. 5A to 5C, the push surface 37 is composed of an arcuate surface 38, a tapered surface 39 and a straight surface 40 formed in order from the left.

The first pressure receiving member 31 is formed in the shape of a nut and engages with a right end (a first end) 26*a* of the output rod 26 in screw-thread fitting. The second pressure receiving member 32 is formed integrally with the end plate 16.

Further, the clamp arm 10 has a lower portion formed with a lower groove 43, into which a left end (a second end) 26*b* of the output rod 26 is inserted. The left end 26*b* is swingably connected to an input portion 10*c* provided in opposite side walls of the lower groove 43 by a connecting pin 44.

The clamping apparatus 3 operates as follows.

Under an unclamping condition shown in FIG. 2, compressed air is discharged from the first chamber 21 and is supplied to the second chamber 22. This moves the piston 20 rightwards (toward the first end) against an urging force of the compression spring 25 with a pressure of the second chamber 22 and at the same time moves the output rod 26 leftwards (toward the second end) with the pressure of the second chamber 22, thereby switching over the clamp arm 10 to an unclamping position (Y). Therefore, a clamping clearance (H) is formed between the output portion 10*b* of the clamp arm 10 and the metal mold 2.

In order to assuredly return the clamp arm 10 to the unclamping position (Y), a return spring (not shown) is preferably attached between the input portion 10*c* of the clamp arm 10 and the end plate 16.

Under the unclamping condition, as shown in FIG. 5A and the right half view of FIG. 6, the force multiplier 30 is switched over to the released state and the engaging balls 34 move radially outwards of the engaging space 33.

When switching over from the unclamping condition of FIG. 2 to a clamping condition of FIG. 3, compressed air is supplied to the first chamber 21 and is discharged from the second chamber 22. This moves the piston 20 leftwards with: a pressure of the first chamber 21 and the urging force, of the compression spring 25. In other words, in the first embodiment, the driving means 47 comprises the :compressed air supplied to the first chamber 21 and the compression spring 25.

When the piston 20 commences the leftward movement, first, as shown in FIG. 5B, the arcuate surface 38 of the push ring 36 quickly pushes the engaging balls 34 radially inwards of the engaging space 33 and promptly moves the output rod 26 rightwards. This immediately swings the clamp arm 10 in a counterclockwise direction to bring the output portion 10*b* into contact with the metal mold 2.

Subsequently, as shown in FIG. 5C, the tapered surface 39 of the push ring 36 strongly pushes the engaging balls 34 radially inwards to move the output rod 26 rightwards strongly. This switches over the clamp arm 10 to a clamping position (X), thereby enabling the output portion 10*b* of the clamp arm 10 to strongly push the metal mold 2 to an upper surface of the bolster 1 as shown in FIG. 3.

By the way, there exits a fitting gap between the T-groove 8 of the bolster 1 and the T-leg 7. Accordingly, in the case of a general T-leg without the projection 7*a*, the support block 6 inclines in a clockwise direction in FIG. 3 by a reaction force which acts from the metal mold 2 to the clamp arm 10 when clamping. This requires to make an extra swing of the clamp arm 10 by an amount corresponding to that inclination.

However, according to the present invention, the T-leg 7 is provided with the projection 7*a*. Thus the metal mold 2 can be straightly held between the projection 7*a* and the output portion 10*b*. This removes the extra swing of the clamp arm 10 to result in the possibility of reducing the stroke of the pneumatic cylinder 12. As a result, the clamping apparatus 3 can be made compact and besides the compressed air is consumed in a decreased amount.

Additionally, under the clamping condition of FIG. 3, even if the pressure of the first chamber 21 lowers or disappears for any reason, the urging force of the compression spring 25 can apply a large sliding resistance to constituent members of the force multiplier 30. This maintains the force multiplier 30 in the locking state, thereby being able to surely hold the clamp arm 10 at the clamping position (X).

When cancelling the clamping condition of FIG. 3, the compressed air within the first chamber 21 is discharged and fresh compressed air is supplied to the second chamber 22. Then as shown in FIG. 2, a pressure of the compressed air within the second chamber 22 returns the piston 20 rightwards against the urging force of the compression spring 25 and at substantially the same time returns the output rod 26 leftwards. This swings the clamp arm 10 in a clockwise direction as shown in FIG. 2 and separates the output portion 10*b* of the clamp arm 10 from the metal mold 2.

A more concrete structure of the force multiplier 30 is explained based on FIG. 5A to FIG. 5C and FIG. 7.

The tapered surface 39 of the push surface 37 has an inclination angle set to about 7.5 degrees with respect to a horizontal plane. Therefore, the tapered surface 39 is tapered at an angle of about 15 degrees. The arcuate surface 38 of the push surface 37 has a radius set to about 3 mm here. In the first embodiment, the cylinder barrel 14 has an outer diameter of about 60 mm.

Further, the first cam surface 31*a* and the second cam surface 32*a* have inclination angles set to about 33 degrees and about 25 degrees with respect to a vertical plane, respectively. In consequence, the engaging space 33 has a wedging angle of about 58 degrees.

Figure 7:
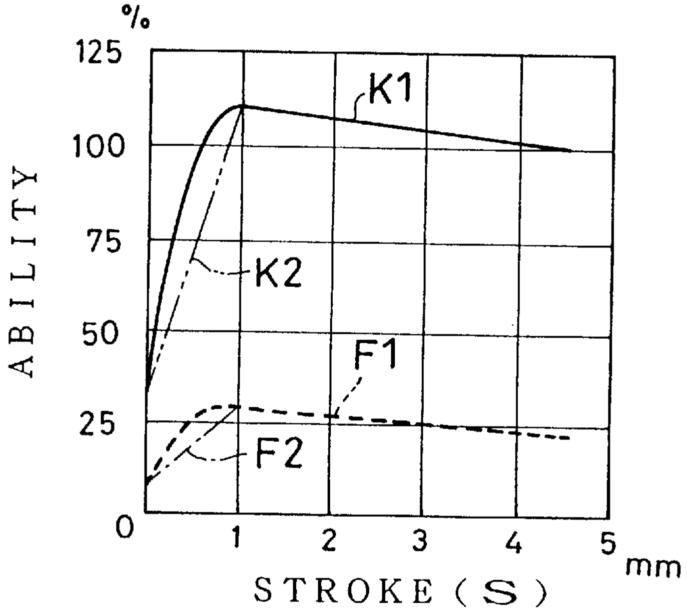

And the provision of the arcuate surface 38 at the left end portion of the push surface 37 brings forth the following advantage as shown in FIG. 7.

In FIG. 7, a broken and curved line (F1) indicates a relationship between a stroke (S) of the output rod 26 (or the clamp arm 10) and a pushing ability of the clamp arm 10. Further, in FIG. 7, a full and curved line (K1) designates a relationship between the stroke (S) and a clamp holding ability of the clamp arm 10. The clamp holding ability means an ability to hold a clamping condition when an external force acts on the metal mold 2 with the clamping apparatus 3 placed under the clamping condition.

When switching over from FIG. 5A to FIG. 5B, the arcuate surface 38 can quickly move the engaging balls 34 radially inwards of the engaging space 33. This makes it possible to enhance the pushing ability and the clamp holding ability to full ones with a short stroke of about 1 mm as shown by the broken and curved line (F1) as well as by the full and curved line (K1) in FIG. 7. This results in increasing an area for a clamping stroke of whole stroke of the output rod 26 (or the clamp arm 10). More concretely speaking, in this first embodiment, the clamping stroke secures a wide area of 1.5 mm to 4.5 mm. Even with an extra stroke taken into consideration, it can secure an area of 2 mm to 3.5 mm.

In an area where the stroke (S) is at least about 1 mm, as the stroke (S) becomes larger, the pushing ability and the clamp holding ability gradually decrease. This is because as the stroke (S) gets larger, the extension amount of the compression spring 25 increases to result in gradually decreasing the urging force of the compression spring 25.

Although the inclination angle of the tapered surface 39 is set to about 7.5 degrees here, it is preferably within a range of about 3 degrees to about 15 degrees and more preferably within a range of about 4 degrees to about 12 degrees. Further, the inclination angles of the respective cam surfaces 31*a* and 32*a* are set to about 33 degrees and about 25 degrees here. However, each of them is preferably within a range of about 15 degrees to about 45 degrees and more preferably within a range of about 20 degrees to about 35 degrees.

In the event that the respective inclination angles are set to appropriate values, the clamp arm 10 produces a pushing force which is about one and half times to four times the driving force of the piston 20. Besides, the clamp arm 10 offers a clamp holding force which comes to have a value ranging from about five times the driving force of the piston 20 close to approximately infinity.

Next, explanation is given for the supply and discharge device 4 by relying on FIG. 1 with reference to FIGS. 2 and 3.

As shown in FIG. 1, the supply and discharge device 4 comprises a first passage 51 and a second passage 52 connected to the first supply and discharge port 23 and to the second supply and discharge port 24, respectively, a pneumatic-pneumatic booster pump 53 provided at a halfway of the first passage 51, a change-over valve 54 which connects one of a primary passage 51*a* of the first passage 51 and the second passage 52 to a pneumatic source 55 and the other to the atmosphere, and an opening-closing valve 56 branched from a secondary passage 51*b* of the first passage 51.

The change-over valve 54 is an electromagnetic valve of four-port and two-position type here. It is changed over between a first position (D) for clamping and a second position (E) for unclamping. At the first position (D), it supplies compressed air of the pneumatic source 55 to the primary passage 51*a* and discharges compressed air of the second passage 52 to the atmosphere. At the 'second position (E) it supplies the compressed air of the pneumatic source 55 to the second passage 52 and discharges the compressed air of the primary passage 51*a* to the atmosphere.

The booster pump 53 comprises a casing 58, a booster piston 60 hermetically inserted into a smaller-diameter hole 59 of the casing 58, a driving piston 62 hermetically inserted into a larger-diameter hole 61 of the casing 58, and a piston rod 63 which connects the both pistons 60 and 62 to each other. The booster pump 53 operates so that it supplies to the first supply and discharge port 23, compressed air having a pressure higher than that of the pneumatic source 55.

More specifically, in a state shown in FIG. 1, the compressed air of the pneumatic source 55 is supplied to a left boost chamber 67 and a right boost chamber 68 via the primary passage 51*a* and a left and a right inlet check valves 65,66. At the same time, the compressed air of the primary passage 51*a* is supplied to a left driving chamber 73 via a pressure regulating valve 70 and a reversing change-over valve 71 at a rightwardly driving position (R). A right driving chamber 74 communicates with the atmosphere through the reversing change-over valve 71. This moves the driving piston 62 and the booster piston 60 rightwards to boost the compressed air within the right boost chamber 68. The thus boosted compressed air is supplied to the first chamber 21 through a right outlet check valve 78, the secondary passage 51*b*, and the first supply and discharge port 23 in the mentioned order.

The pressure of the boosted compressed air is variable by adjusting a set pressure of the pressure regulating valve 70.

When the booster piston 60 moves to the vicinity of a right stroke end and pushes a change-over rod 80 rightwards, the reversing change-over valve 71 is changed over to a leftwardly driving position (L). Then the compressed air of the pressure regulating valve 70 is supplied to the right driving chamber 74 and the left driving chamber 73 communicates with the atmosphere. This moves the driving piston 62 and the booster piston 60 leftwards to boost the compressed air of the left boost chamber 67. The thus boosted compressed air is supplied to the first chamber 21 through a left outlet check valve 77, the secondary passage 51*b*, and the first supply and discharge port 23 in the mentioned order.

And when the driving piston 62 moves to the vicinity of a left stroke end and pushes the change-over rod 80 leftwards, the reversing change-over valve 71 is changed over from the leftwardly driving position (L) to the rightwardly driving position (R) to move the driving piston 62 and the booster piston 60 rightwards.

As mentioned above, the reciprocal movement of the booster piston 60 supplies high pressure compressed air to the first chamber 21 via the secondary passage 51*b* of the first passage 51. The high pressure compressed air strongly drives the piston 20 leftwards. Subsequently, as mentioned above, the piston 20 more strongly clamps the output rod 26 and the clamp arm 10 through the force multiplier 30.

In consequence, even if the compressed air of the pneumatic source 55 has a relatively low pressure, it is possible to provide a clamping apparatus 3 which owns a strong clamping force.

When the secondary passage 51*b* has its pressure increased to a set pressure, a pressure switch 82 detects it and the detected signal makes it possible to confirm that the clamping apparatus 3 has come to the clamping condition.

Branched from the secondary passage 51*b* is a depressurizing passage 84, which is provided with the opening-closing valve 56. Here the opening-closing valve 56 is a pilot type change-over valve of two-port and two-position. It is changed over to a closed position (M) through an urging force of a spring 85 and to an opened position (N) with a pressure of a pilot passage 86 connected to the second passage 52.

When switching over the clamping apparatus 3 from the clamping condition to the unclamping condition, it suffices if the change-over valve 54 is changed over from the first position (D) to the second position (E). Then the compressed air of the pneumatic source 55 is supplied to the second chamber 22 via the second passage 52, and the second supply and discharge port 24. Simultaneously, the pressure of the pilot passage 86 changes over the opening-closing valve 56 to the opened position (N). Therefore, the compressed air within the first chamber 21 is discharged to the atmosphere through the opening-closing valve 56. This unclamps the clamp arm 10 as mentioned above.

The first embodiment can be modified as follows.

It may be provided with an actuator which moves the clamping apparatus 3 longitudinally of the T-groove 8.

Instead of providing the T-groove 8 in the bolster 1, it is possible to fix a guide block provided with a T-groove to an upper surface of the bolster 1 and to fit the T-leg 7 into the T-groove of the guide block.

Figure 8:
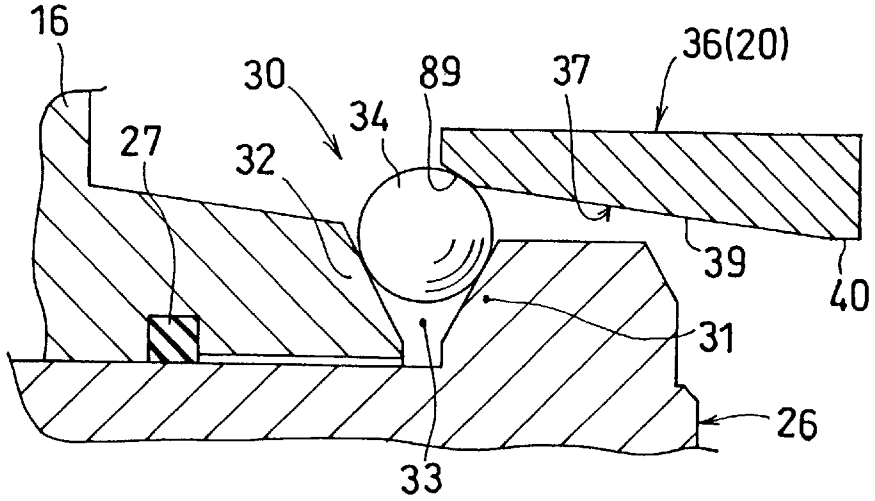

FIG. 8 shows a first modification of the force multiplier 30 and is similar to FIG. 5A. In this first modification, a left portion of the push surface 37 is formed from a steep tapered surface 89 instead of the arcuate surface 38 in FIG. 5A. Here the steep tapered surface 89 has an inclination angle set to about 30 degrees (about 60 degrees in terms of a tapered angle).

In an area of the steep tapered surface 89, as shown in FIG. 7, the pushing ability of the clamp arm 10 varies as indicated by a one-dot chain line (F2) and the clamp holding ability of the clamp arm 10 alters as indicated by a two-dot chain line (K2).

Figure 9:
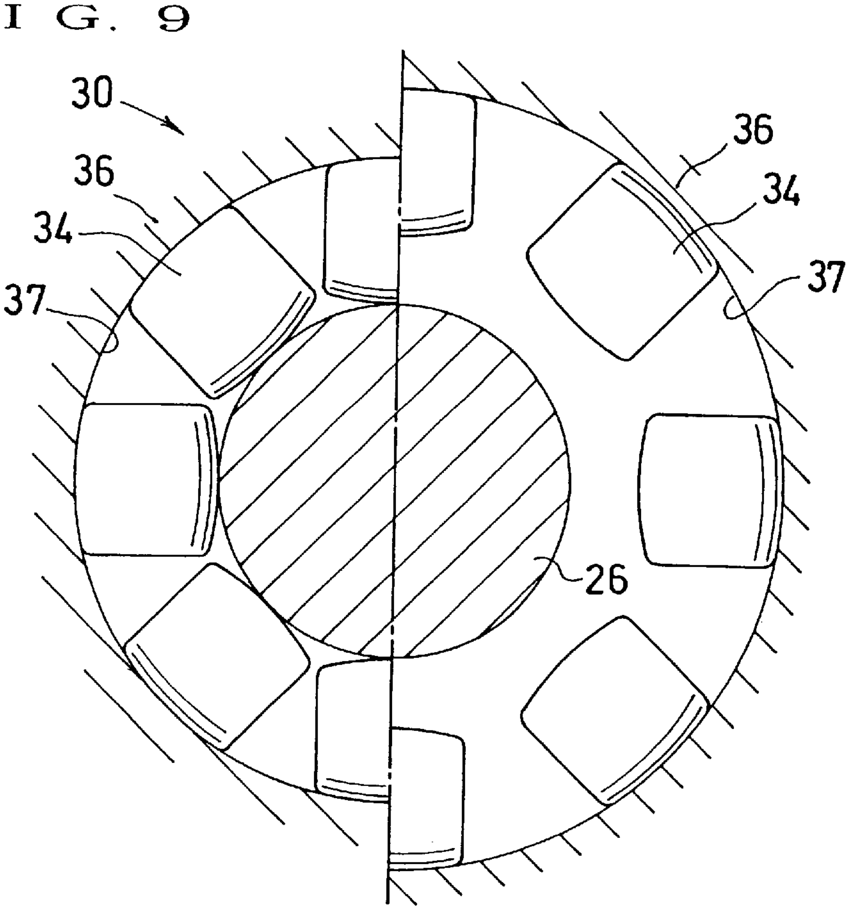

FIG. 9 shows a second modification of the force multiplier 30 and is similar to FIG. 6. In this case, as for the engaging members 34, rollers are adopted instead of the balls in FIG. 6.

The roller engaging members 34 are so large in allowable surface pressure that they are excellent in durability. This offers an advantage that the clamping apparatus 3 can be used without maintenance over a prolonged period of time.

Figure 10:
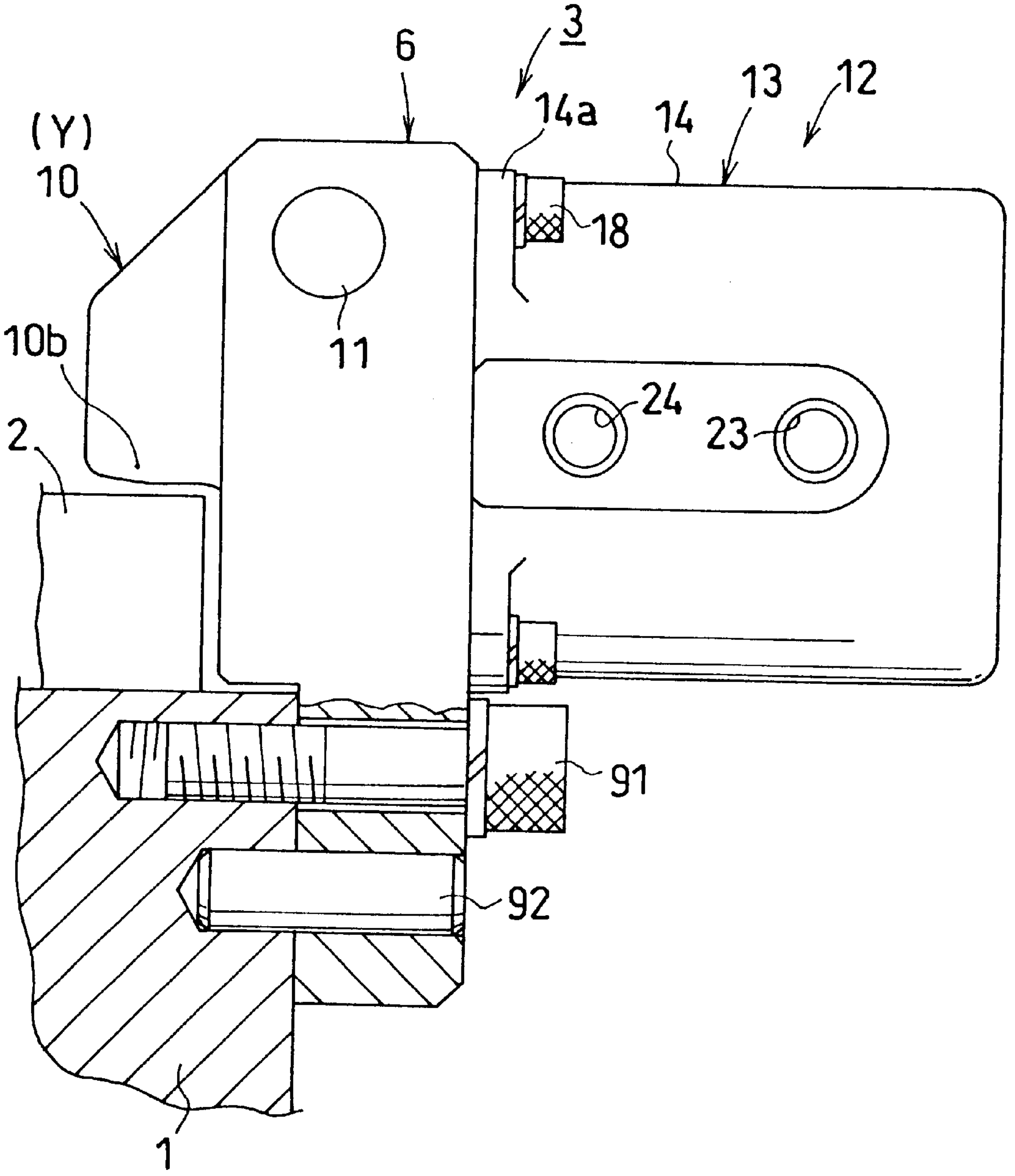
FIG. 10 shows a second embodiment of the present invention and is an elevational view similar to FIG. 2.

FIG. 10 shows a second embodiment of the present invention and is an elevational view similar to FIG. 2 of the first embodiment. In the second embodiment of FIG. 10, same constituent members as those in the first embodiment are explained by attaching same characters. The second embodiment differs from FIG. 2 of the first embodiment on the following points.

The bolster 1 has a right side surface to which a lower portion of the support block 6 is detachably attached by a plurality of bolts 91. Here only one of the bolts 91 is shown. Numeral 92 designates a positioning pin.

When switching over from an unclamping condition shown in FIG. 10 to a clamping condition, it is sufficient if the compressed air is discharged from the second supply and discharge port 24 and fresh compressed air is supplied to the first supply and discharge port 23 as well as in the first embodiment. Then the clamp arm 10 swings in a counter-clockwise direction around the pivot pin 11 and the output portion 10*b* of the clamp arm 10 fixes the metal mold 2 to the upper surface of the bolster 1.

The support block 6 may be attached to the upper surface of the bolster 1.

Figure 11:
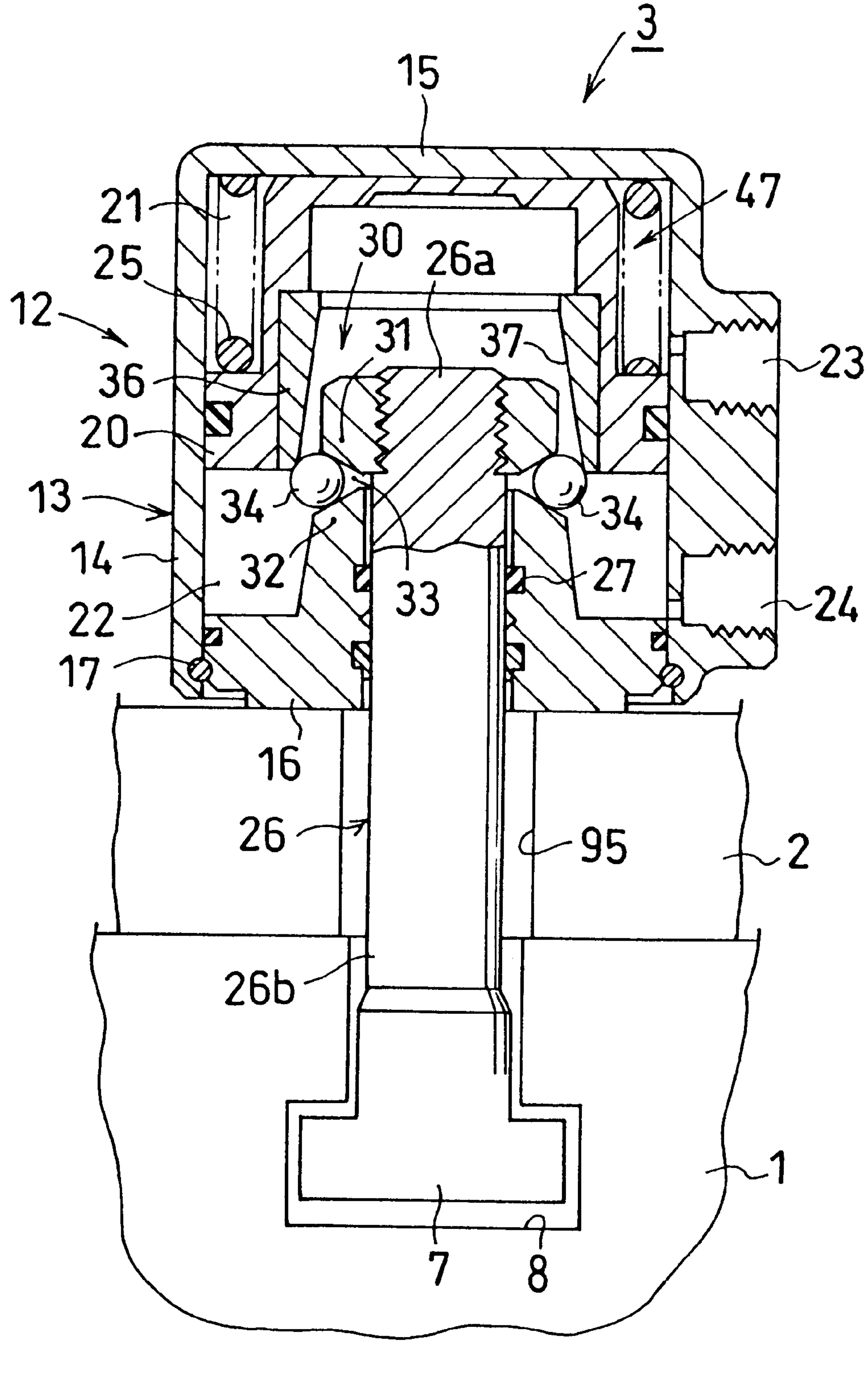
FIG. 11 shows a third embodiment of the present invention and is a sectional view similar to FIG. 2.

FIG. 11 shows a third embodiment and is a sectional view similar to FIG. 2 of the first embodiment. In the third embodiment of FIG. 11, same constituent members as those in the first embodiment are explained by attaching same characters. The third embodiment differs from FIG. 2 of the first embodiment on the following points.

The metal mold 2 has an end surface formed with a rod insertion groove 95 U-shaped when seen in plan, into which the output rod 26 is inserted. The output rod 26 has the lower end 26*b* of the second end provided with the T-leg 7 which engages with the T-groove 8 of the bolster 1. Placed on the metal mold 2 is the end plate 16 of the second end wall of the cylinder portion 13.

Under an unclamping condition shown in FIG. 11, the compressed air is discharged from the first chamber 21 and fresh compressed air is supplied to the second chamber 22. This pushes down the output rod 26 with a pressure of the second chamber 22, thereby forming a contact gap between the T-leg 7 provided at the lower portion of the output rod 26 and an upper portion of a peripheral wall of the T-groove 8.

When switching over from the unclamping condition to a clamping condition, the compressed air is discharged from the second chamber and fresh compressed air is supplied to the first chamber 21, thereby strongly lowering the, piston 20. Then the engaging balls 34 raise the output rod 26 through the first pressure receiving member 31. Simultaneously, the engaging balls 34 push down the end plate 16 through the second pressure receiving member 32. The end plate 16 pushes the metal mold 2 to the upper surface of the bolster 1.

The first to the third embodiments can be modified as follows.

The engaging members 34 of the force multiplier 30 may be composed of wedge-like sliding members instead of the exemplified balls rollers or the like rolling members.

The first pressure receiving member 31 may be formed integrally with the output rod 26 instead of separately therefrom. Further, the second pressure receiving member 32 may be formed separately from the end plate 16 instead of integrally therewith.

The engaging space 33 is sufficient if it narrows radially inwards. In consequence, either of the first cam surface 31*a* and the second cam surface 32*a* may be plane.

The driving means, 47 is satisfactory if it drives the piston 20 toward the second chamber 22. Accordingly, the clamp holding compression spring 25 attached within the first chamber 21 may be omitted. Further, alternatively, the piston 20 may be driven merely by the compression spring 25 without supplying compressed air to the first chamber 21.

The booster pump 53 is not limited to that of exemplified type. For example, it may be of single-acting type instead of double-acting type and also may be of pneumatic-hydraulic type instead of pneumatic-pneumatic type. Additionally, the booster pump 53 may be removed from the supply and discharge device 4 and the compressed air of the pneumatic source 55 may be directly supplied to the first chamber 21.

The working fluid of the clamping apparatus 3 may be other kinds of gas: such as nitrogen and besides may be liquid such as pressurized oil instead of the compressed air.

The clamping apparatus 3 may fix other kinds of objects to be fixed such as a workpiece instead of the exemplified metal mold 2.

What is claimed is:

1. A clamping apparatus comprising:

a cylinder portion (13) having a first end wall (15) and a second end wall (16);

an annular piston (120) having a push surface (37) and inserted into the cylinder portion (13) axially movably and hermetically;

a first chamber (21) having a driving means (47), and formed between the first end wall (15) and the piston (20);

a second chamber (22) formed between the second end wall (16) and the piston (20) so that pressurized fluid is supplied to the second chamber (22) and is discharged therefrom;

an output rod (26) having a first end **(26*a*) and arranged substantially concentrically with the piston (20), the output rod (26) being axially movably and hermetically inserted into the second end wall (16)**;

a first pressure receiving member (31) and a second pressure receiving member (32) axially opposing to each other in an annular space defined between the piston (20) and the output rod (26) within the second chamber (22), the first pressure receiving member (31) and the second pressure receiving member (32) being connected to the first end **(26*a*) of the output rod (26) and to the second end wall (16)**, respectively;

an annular engaging space (33) formed between the first pressure receiving member (31) and the second pressure receiving member (32) so that it narrows radially inwards; and a plurality of engaging members (34) inserted into the engaging space (33) and spaced apart from each other peripherally at a predetermined interval, the driving means (47) driving the piston (20) toward the second end wall (16), thereby enabling the push surface (37) of the piston (20) to drive the output rod (26) toward the first end wall (15) through the engaging members (34) and the first pressure receiving member (31) in the mentioned order and on the other hand, the pressurized fluid, when it is supplied to the second chamber (22), driving the piston (20) to return it toward the first end wall (15) and the output rod (26) to return it toward the second end wall (16).

2. The clamping apparatus as set forth in claim 1, wherein the engaging members (34) comprise rolling members.

3. The clamping apparatus as set forth in claim 1 further comprising:

a support block (6) fixing the cylinder portion (13);

a clamp arm (10) having a fulcrum portion **(10*a*) and an input portion (10*c*); and the output rod (26) having a second end (26*b*), the support block (6) swingably supporting the fulcrum portion (10*a*), the second end (26*b*) of the output rod (26) being swingably connected to the input portion (10*c*)**.

4. The clamping apparatus as set forth in claim 3, wherein the cylinder portion (13) is detachably attached to the support block (6).

5. The clamping apparatus as set forth in claim 3 further comprising:

a T-groove (8) provided in a fixing pedestal (1) or in a guide block attached to the fixing pedestal (1);

a T-leg (7) provided at a lower portion of the support block (6) so as to engage with the T-groove (8); and a projection **(7*a*) provided on the T-leg (7) so as to vertically face an output portion (10*b*) of the clamp arm (10)**.

6. The clamping apparatus as set forth in claim 3 further comprising:

the fixing pedestal (1) having a side surface and an upper surface; and the support block (6) detachably attached to the side surface or the upper surface of the fixing pedestal.

7. The clamping apparatus as set forth in claim 1, wherein the push surface (37) of the piston (20) comprises an arcuate surface (38) and a tapered surface (39) formed in the mentioned order from the second end wall (16) toward the first end wall (15).

8. The clamping apparatus as set forth in claim 2 further comprising:

a support block (6) fixing the cylinder portion (13);

a clamp arm (10) having a fulcrum portion **(10*a*) and an input portion (10*c*); and the output rod (26) having a second end (26*b*), the support block (6) swingably supporting the fulcrum portion (10*a*), the second end (26*b*) of the output rod (26) being swingably connected to the input portion (10*c*)**.

9. The clamping apparatus as set forth in claim 4 further comprising:

a T-groove (8) provided in a fixing pedestal (1) or in a guide block attached to the fixing pedestal (1);

a T-leg (7) provided at a lower portion of the support block (6) so as to engage with the T-groove (8); and a projection **(7*a*) provided on the T-leg (7) so as to vertically face an output portion (10*b*) of the clamp arm (10)**.

10. The clamping apparatus as set forth in claim 4 further comprising:

the fixing pedestal (1) having a side surface and an upper surface; and the support block (6) detachably attached to the side surface or the upper surface of the fixing pedestal (1).

11. The clamping apparatus as set forth in claim 2, wherein the push surface (37) of the piston (20) comprises an arcuate surface (38) and a tapered surface (39) formed in the mentioned order from the second end wall (16) toward the first end wall (15).

12. The clamping apparatus as set forth in claim 3, wherein the push surface (37) of the piston (20) comprises an arcuate surface (38) and a tapered surface (39) formed in the mentioned order from the second end wall (16) toward the first end wall (15).

13. The clamping apparatus as set forth in claim 4, wherein the push surface (37) of the piston (20) comprises an arcuate surface (38) and a tapered surface (39) formed in the mentioned order from the second end wall (16) toward the first end wall (15).

* * * * *